United States Patent
Tarrago et al.

(10) Patent No.: US 9,344,428 B2
(45) Date of Patent: May 17, 2016

(54) METHOD AND SYSTEM FOR DIGITALLY CERTIFYING THE ASSOCIATION BETWEEN AN ENTITY AND A PLACE

(75) Inventors: Arnaud Tarrago, Paris (FR); Pascal Sitbon, Chatillon (FR); Frédéric Silvi, Chatillon (FR)

(73) Assignee: Electricite de France, Paris (FR)

( * ) Notice: Subject to any disclaimer, the term of this patent is extended or adjusted under 35 U.S.C. 154(b) by 0 days.

(21) Appl. No.: 14/342,637

(22) PCT Filed: Sep. 6, 2012

(86) PCT No.: PCT/FR2012/052000
§ 371 (c)(1),
(2), (4) Date: Mar. 4, 2014

(87) PCT Pub. No.: WO2013/034860
PCT Pub. Date: Mar. 14, 2013

(65) Prior Publication Data
US 2014/0201812 A1 Jul. 17, 2014

(30) Foreign Application Priority Data
Sep. 6, 2011 (FR) ...................................... 11 57896

(51) Int. Cl.
*G06F 7/04* (2006.01)
*H04L 29/06* (2006.01)
(Continued)

(52) U.S. Cl.
CPC ............ *H04L 63/0876* (2013.01); *G06F 21/44* (2013.01); *G06Q 10/10* (2013.01);
(Continued)

(58) Field of Classification Search
CPC .................................................... H04L 63/0876
USPC ............................................................. 726/3
See application file for complete search history.

(56) References Cited

U.S. PATENT DOCUMENTS 6,414,629 B1 * 7/2002 Curcio ..................... 342/357.52
6,462,707 B1 * 10/2002 Clark ...................... 342/357.395
(Continued)

FOREIGN PATENT DOCUMENTS

| EP | 2 083 531 A2 | 7/2009 |
| FR | 2 929 471 A1 | 10/2009 |

(Continued)

OTHER PUBLICATIONS

Boonyarattaphan et al., "Spatial-Temporal Access Control for e-Health Services," 2010 IEEE Fifth International Conference on Networking, Architecture and Storage (NAS), IEEE, Piscataway, NJ, USA, pp. 269-276 (Jul. 15, 2010).

(Continued)

*Primary Examiner* — Peter Shaw
(74) *Attorney, Agent, or Firm* — Drinker Biddle & Reath LLP (57) ABSTRACT

A method of processing data in order to digitally certify the association of at least one entity with a place, the method comprising the receipt of at least one piece of positioning data coming from at least one locating device located in the proximity of said place, the generation of a digital certificate associating the entity with said place according to the positioning data received, and the checking of the association of the entity with said place, by means of said digital certificate, in order to obtain a service dependent on the association of the entity with said place.

15 Claims, 4 Drawing Sheets

(51) Int. Cl.
*G06Q 10/10* (2012.01)
*H04L 9/08* (2006.01)
*H04L 9/32* (2006.01)
*G06F 21/44* (2013.01)

(52) U.S. Cl.
CPC ............ *H04L 9/0872* (2013.01); *H04L 9/3234* (2013.01); *G06F 2221/2111* (2013.01); *G06F 2221/2151* (2013.01)

(56) References Cited

U.S. PATENT DOCUMENTS

| | | | |
|---|---|---|---|
| 7,194,620 B1* | 3/2007 | Hayes | 713/157 |
| 2002/0120848 A1 | 8/2002 | Mont et al. | |
| 2003/0087604 A1 | 5/2003 | Stein et al. | |
| 2007/0200756 A1* | 8/2007 | Saito | 342/357.09 |
| 2011/0022845 A1 | 1/2011 | Pietre-Cambacedes et al. | |
| 2012/0208557 A1* | 8/2012 | Carter | G01S 19/23 455/456.1 |

FOREIGN PATENT DOCUMENTS

| | | |
|---|---|---|
| JP | 2005-508501 A | 3/2005 |
| JP | 2006-285357 A | 10/2006 |
| JP | 2006-331048 A | 12/2006 |
| JP | 2008-172282 A | 7/2008 |
| WO | WO 03/069525 A1 | 8/2003 |
| WO | WO 2005/091230 A1 | 9/2005 |

OTHER PUBLICATIONS

Durresi et al., "Secure Spatial Authentication for Mobile Stations in Hybrid 3G-WLAN Serving Networks," The Third International Conference on Availability, Reliability and Security, 2008, Ares 08, IEEE, Piscataway, NJ, USA, pp. 1325-1331 (Mar. 4, 2008).

Gonzalez-Tablas Ferreres et al., "Spatial-Temporal Certification Framework and Extension of X.509 Attribute Certificate Framework and SAML Standard to Support Spatial-Temporal Certificates," Public Key Infrastructure, Lecture Notes in Computer Science, Springer Berlin Heidelberg, Berlin, Heidelberg, pp. 321-329 (Jun. 28, 2007).

Gonzalez-Tablas Ferreres et al., "Guaranteeing the Authenticity of Location Information," IEEE Pervasive Computing, IEEE Service Center, Los Alamitos, CA, US, vol. 7 (3), pp. 72-80 (Jul. 1, 2008).

Mitsubishi Electric, "HNBs Location Certification," R3-080065, 3GPP TSG RAN WG3 Meeting #59 Draft, Mobile Competence Centre, Sorrento, Italy, pp. 1-3 (Feb. 5, 2008).

Imazawa et al., "Positional authentication system using GPS data and the stopping point calculation method," Computer Security Symposium 2008, Japan, Information Processing Society of Japan, vol. 2008 (8), pp. 707-712 (Oct. 8, 2008).

English Translation of Office Action issued for JP 2014-529054 (Jan. 26, 2015).

* cited by examiner

METHOD AND SYSTEM FOR DIGITALLY CERTIFYING THE ASSOCIATION BETWEEN AN ENTITY AND A PLACE

CROSS-REFERENCE TO RELATED APPLICATIONS

This application is the U.S. national phase of the International Patent Application No. PCT/FR2012/052000 filed Sep. 6, 2012, which claims the benefit of French Application No. 11 57896 filed Sep. 6, 2011, the entire content of which is incorporated herein by reference.

FIELD

The invention relates to a system for delivering digital certificates certifying an association between a place and an entity, which can equally be an individual and an object, and in particular for delivering digital residence certificates that can serve for accessing services.

BACKGROUND

In certain situations of everyday life, certificates of association with a place are requested from individuals in order to prove that they do indeed reside or work in a particular place.

This can in particular be the case in administrative procedures, where the issuing of certain documents requires such proof, or when there is a request to access certain services, the supply of which depends on the individual's place of residence.

These residence certificates were initially obtained in paper form, based on paper documents supplied to the address of the place in question by a third party having a well established reputation. Thus, for example, paper telephone bills or bills from a supplier of an energy resource supplying the individual's premises may be thought of.

However, with the arrival of the digital age, it has proved more practical to produce such certificates in digital form, which can be handled more easily and can be encrypted if necessary, rather than in paper form.

An example of a method for obtaining such a digital residence certificate is thus described in French patent application FR 08 52 059. In the system described in that application, by anchoring a certifying device to a meter, itself anchored in a residence, it is possible to obtain digital residence certificates having a certain degree of reliability.

However, such a system has certain drawbacks.

Thus, this type of digital certificate depends entirely on the presence of an energy flow meter in the individual's residence, which makes this solution rather inflexible and does not allow the delivery of digital residence certificates for residences that do not have such a meter, or the delivery of digital certificates relating to geographical places other than a residence, for example relating to an office or to business premises.

Moreover, the use of this certification system remains strictly local, which limits the services that can be obtained with this type of digital certificate.

SUMMARY

The present invention will remedy the aforementioned major drawbacks, in that it aims to offer a solution for delivering a digital certificate of association between an individual, or an object, and a place that is not dependent on the presence of a meter, and can be used in a context other than a strictly local context.

The present invention thus proposes a method of data processing for digitally certifying the association of at least one entity with a place, this method comprising the steps consisting of:

receiving at least one positioning data coming from at least one locating device located in the proximity of this place, the positioning data received being associated with a reliability indicator, generating a digital certificate associating the entity with this place as a function of the positioning data received, said certificate being generated moreover according to a confidence index, said confidence index being a function of an aggregation of reliability indicators of positioning data received, and verifying, by means of this digital certificate, the association of the entity with this place in order to obtain, as a function of the confidence index of the digital certificate, a service that is dependent on the association of the entity with this place.

In one embodiment, the entity is an individual frequenting this place at least temporarily and this digital certificate is moreover generated as a function of at least one identifying and/or authenticating data of the individual.

In another embodiment, the entity is an object located in this place and this digital certificate is moreover generated as a function of at least one identifying and/or authenticating data of the object.

According to an advantageous embodiment, the method comprises recording the digital certificate on a mobile recording medium, which can be presented to a service provider, in order to permit verification of the association of the entity with said place by this service provider.

According to another advantageous embodiment, the method comprises an exchange of data relating to the digital certificate with a remote server belonging to a service provider, following receipt of a request for justification of place emanating from this service provider, in order to permit verification of the association of the entity with this place by the service provider.

Advantageously, a plurality of positioning data is received coming respectively from a plurality of locating devices located in the proximity of said place.

In another embodiment, at least one additional positioning data is moreover received coming from a nearby place separate from this place, generation of the digital certificate being carried out moreover as a function of this additional positioning data.

In particular, this additional positioning data is received coming from a locating device located in the proximity of this nearby place or from a certifying device located in this nearby place.

The present invention also proposes a certifying device, capable of digitally certifying the association of at least one entity with a place, comprising a receiving module and a processing module, in which:

the receiving module is able to receive at least one positioning data emitted by a locating device located in the proximity of this place, the positioning data received being associated with a reliability indicator, and the processing module is configured for generating a digital certificate depending on a positioning data received by the receiving module and a confidence index, said confidence index being a function of an aggregation of reliability indicators of positioning data received by the receiving module, this digital certificate being verifiable by a service provider in order to obtain, as a function of the confidence index of the digital certificate, a service that is dependent on the association of the entity with this place.

In one embodiment, the processing module further comprises a recording module configured for recording the digital certificate on a mobile recording medium that can be presented to the service provider in order to obtain the service.

The processing module can also further comprise a communication module capable of receiving a request for justification of place emanating from a remote server belonging to the service provider and transmitting, to this remote server, data relating to this digital association.

The present invention also proposes a data processing system, for digitally certifying the association of at least one entity with a place, comprising at least one certifying device as described above, and at least one locating device configured for transmitting at least one positioning data to the certifying device.

Advantageously, this data processing system comprises a plurality of separate locating devices, each of said locating devices being configured for transmitting a positioning data to the certifying device.

The present invention finally proposes a computer program comprising code instructions for carrying out the step of generating the digital certificate of the method described above, when these instructions are executed by the processing module of a certifying device as described above. Such a program must be regarded as a product within the scope of protection that is sought by the present patent application.

BRIEF DESCRIPTION OF THE DRAWINGS

Other features and advantages of the invention will become clear on examining the detailed description given below, and from the appended drawings in which.

DETAILED DESCRIPTION

Figure 1:
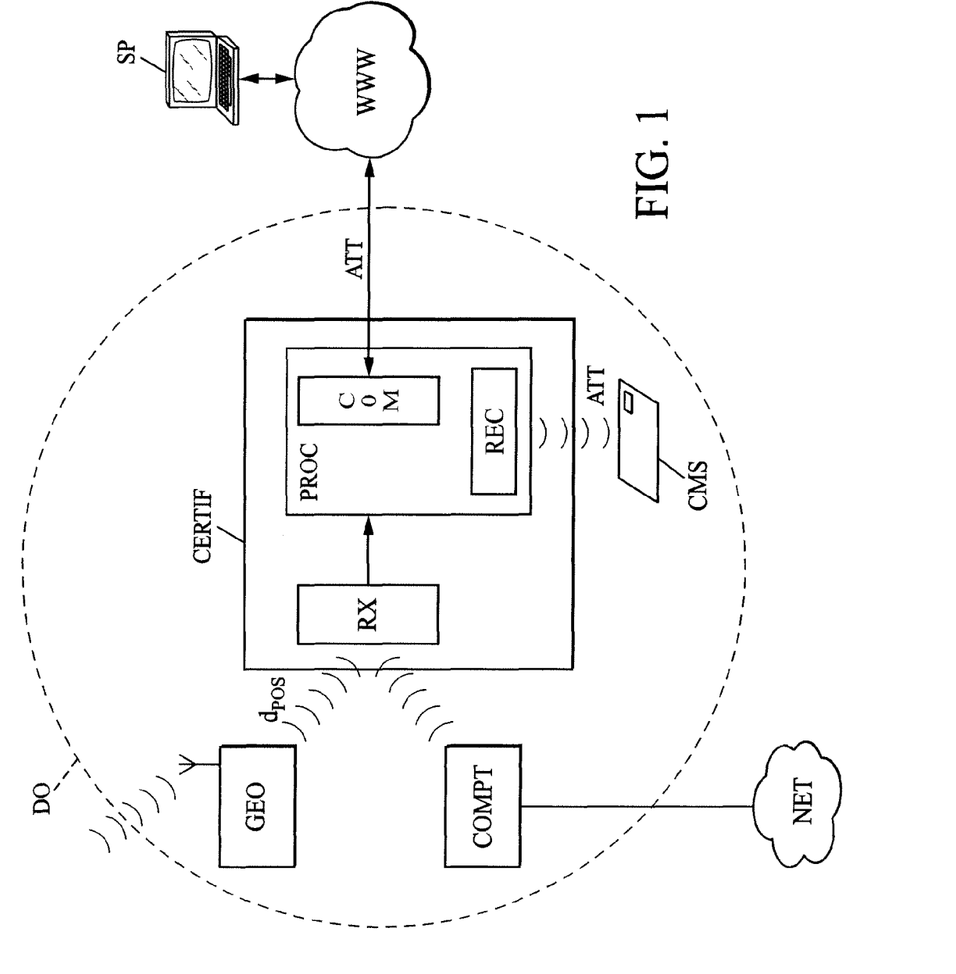
FIG. 1 is a synoptic diagram illustrating a data processing system, for delivering a digital certificate associating an entity with a place, according to the present invention.

Reference is first made to FIG. 1, which shows a synoptic diagram illustrating a data processing system according to the present invention, capable of delivering a digital certificate of association between an entity and a place.

This system is advantageously installed in the geographical environment of a particular place DO, and aims to supply a digital certificate ATT associating one, or even several, entity or entities with this place DO.

Such a place DO equally denotes here a dwelling (this place is then commonly designated with the term residence), commercial premises, an office or any other place.

"Entity" means here an individual frequenting, at least temporarily, this place DO or an object located in this place DO. Thus, the digital certificate ATT is a digital certificate associating, with this place DO, one (or more) individual(s) frequenting this place DO or one (or more) object(s) located in this place DO, or even any combination of these possibilities.

"Digital certificate associating an entity with a place" then means any data for showing that the entity in question, whether it is an individual or the object, associated with this certificate, has a strong enough relationship with this place to be able to receive certain services from third parties. In other words, this digital certificate certifies the association of this entity with the place in question.

In particular, when the digital certificate ATT is associated with an individual frequenting the place DO, this digital certificate can serve to prove that this individual resides in this place DO when this place is the individual's residence (it is then called residence certificate), or that he works in this place DO when this place is the individual's place of work, or even that this place is frequented temporarily by this individual.

When it is a digital certificate ATT associated with an object located in this place DO, for example a domestic equipment, this digital certificate ATT can serve to prove that the object in question does indeed belong to the place DO in question.

This system thus comprises, on the one hand, a certifying device CERTIF whose role is to generate the digital certificate ATT for association with the place DO.

It further comprises one (or more) locating device(s) GEO capable of receiving and consolidating geographic positioning information and of delivering, on the basis of this consolidation, one or more piece(s) of positioning data $d_{POS}$.

This locating device GEO is located physically in the proximity of the place DO, i.e. in a restricted geographic area that includes the place DO and whose size is limited (reasonable extent of the place DO in proportion to its size), so that the position of the locating device GEO remains geographically similar to the position of the place DO, and therefore that the position data $d_{POS}$ also allow the geographic position of the place DO to be determined with a small margin of error depending on the size of the restricted geographic area.

The locating device GEO is therefore located advantageously actually within the place DO, but can also be located outside this place DO, in the immediate proximity of the latter in a restricted geographic area.

Such a device can typically be implemented in the form of a geolocation module, for example in the form of a receiver of the GPS (for Global Positioning System) type, but can also take the form of a WiFi receiving antenna (802.11a-b-n), GSM/GPRS, Bluetooth (802.15.1-2-3), Zigbee (802.15.4), of a PLC (Power Line Communication) communication module, or of any other receivers capable of receiving electromagnetic signals in order to verify and/or correlate various significant data of a geographic place (WiFi networks in the proximity of the place to be certified, for example within one and the same building, Bluetooth authentication terminal emanating from the electricity meter, PLC network of the electricity meter, etc.).

The positioning data $d_{POS}$ coming from such modules are advantageously associated with a reliability indicator. The reliability indicator qualifies the credibility and security of the positioning data $d_{POS}$ in question. For example, a positioning data $d_{POS}$ delivered following consolidation such as mentioned above has a reliability indicator with a higher value than a positioning data delivered without consolidation. A reliability indicator of a positioning data $d_{POS}$ can also be determined according to characteristics of the locating module GEO from which it comes: type of GEO module, position of the GEO module relative to the place DO, level of security of the GEO module, etc.

In one possible embodiment, the reliability indicator of a positioning data $d_{POS}$ is determined by means of the receiving module RX of the certifying device CERTIF. The receiving module RX can determine a reliability indicator in relation to the remoteness or level of security of the locating device GEO. For example, the module RX determines a reliability indicator of high value for a positioning data $d_{POS}$ coming from a GPS module in the immediate proximity of the place DO. According to another example, the module RX determines a reliability indicator of low value for a positioning data $d_{POS}$ coming from a public WiFi network, outside of the place DO.

According to another possible embodiment, the locating module GEO itself can determine the reliability indicator, in particular on the basis of the positioning data used for consolidation of the positioning data $d_{POS}$. In this particular case, the reliability indicator can be transmitted to the receiving module RX together with the corresponding positioning data $d_{POS}$. As a variant or in addition, the reliability indicator can be determined according to the distance of the locating device GEO relative to the certifying device CERTIF, thus qualifying the relevance of the positioning data $d_{POS}$ sent. A single locating device GEO is illustrated in FIG. 1, but the invention also covers the advantageous case where several locating devices GEO send their respective positioning data to the certifying device CERTIF. This embodiment is particularly advantageous in that it is more resistant to security attacks of the "man in the middle" type, capable of replacing one given device but having more difficulty with a plurality of devices.

Moreover, this embodiment makes it possible to obtain a plurality of positioning data $d_{POS}$ with their respective reliability indicator so as to determine the positioning data that is most relevant and/or most secure among the positioning data received by the certifying device CERTIF.

For this purpose, the system can also comprise a locating device consisting of a flow meter COMPT (for example an electricity, water or gas meter), connected to a utility supply network (designated NET in FIG. 1) and having a transmitter capable of transmitting positioning data relating to the position of the meter to other devices.

In particular, this flow meter can be located on the landing of a building, outside the flat for which we wish to certify attachment, and can have a method of transmission—based on landline or wireless infrastructure—for delivering positioning data to a certifying device CERTIF located in the flat in question.

For its part, the certifying device CERTIF comprises a receiving module RX and a processing module PROC.

The receiving module RX is able to receive one (or more) piece(s) of positioning data $d_{POS}$ emitted by the locating device(s) GEO, and transmission of this data can be wireless or by cable. Such a positioning data $d_{POS}$ is associated with a reliability indicator qualifying it. This reliability indicator can in particular be determined according to one of the aforementioned embodiments, via the locating module GEO or the receiving module RX.

A single locating device GEO is shown in FIG. 1, but positioning data coming from any number of separate locating devices can be received by the receiving module RX, thus permitting cross-referencing of data offering a greater guarantee as to the location of the place DO.

As for the processing module PROC, it is configured for generating a digital certificate ATT as a function of the at least one positioning data $d_{POS}$ received by the receiving module RX. This module therefore comprises a calculating unit, such as a processor or a microprocessor, capable of processing positioning data received from the receiving module RX in order to obtain the digital certificate ATT. The processing module PROC is further configured for generating the digital certificate ATT as a function of an associated confidence index. This confidence index is in particular a function of an aggregation of the reliability indicators of positioning data $d_{POS}$ received.

For example, when a single positioning data $d_{POS}$ is received by the receiving module RX coming from a locating device GEO, the digital certificate ATT is generated on the basis of this single data and the confidence index of the certificate generated is correlated with the reliability indicator of the data received.

According to another example, when a plurality of positioning data is received by the receiving module RX, coming respectively from any number of separate locating devices, the processing module PROC is configured for aggregating the positioning data $d_{POS}$ and their respective reliability indicators.

According to a first possible embodiment, aggregation consists of generating a digital certificate ATT according to:
the weighted average of the positioning data received, and
the weighted average of the reliability indicators of the positioning data received.

Thus, the digital certificate ATT generated results from cross-referencing of the data received, making it possible to qualify a confidence level attributable to the certificate generated.

In a second possible embodiment, aggregation can for example consist of discriminating the positioning data having the highest reliability indicator among the plurality of data received. Thus, the positioning data retained can be regarded as the most secure and/or the most relevant for generating the digital certificate ATT. The confidence index of the certificate generated is then based on the reliability indicator of the most appropriate positioning data.

This digital certificate ATT can then be used by a service provider so that a service can be obtained dependent on a proven association with the place DO. Moreover, this digital certificate ATT can advantageously be used by the service provider in relation to its confidence index. As an example, the service provider can give different kinds of access to its users depending on the confidence index of the digital certificate ATT presented. As another example, when the confidence index of the digital certificate ATT is low, the individual has restricted access, whereas a wide range of usage options is offered to individuals having a digital certificate with a high confidence index.

In order to allow use of this digital certificate ATT by the service provider, the processing module PROC is interconnected to a recording module REC configured for recording the digital certificate on a mobile medium CMS, for example by means of recording of the magnetic type or RFID. This interconnection between the modules REC and PROC can be done locally within one and the same material device, but also remotely, taking advantage of a communication infrastructure, as is illustrated below in FIG. 2.

Said mobile recording medium CMS is a secure container, which can thus take the form of a smartphone, a magnetic card or a smart card (for example a public transport pass), on which the data corresponding to the digital certificate are recorded, and advantageously protected, in which case this recording medium is denoted by the term secure mobile recording medium. The CMS medium has capacity for accommodating several digital certificates ATT, each certificate being associated exclusively with a target service.

This secure mobile recording medium CMS can itself be presented physically to a remote service provider, in order to obtain a service requiring such a digital certificate of association with a place.

For example, when the service provider is a shop making offers reserved for the people living in a particular district, the individual living in the place DO can present the secure mobile recording medium CMS to this shop in order to take advantage of the offer.

As an alternative to the use of the CMS medium, the processing module PROC can comprise a communication module COM communicating with a remote server SP belonging to a service provider. This communication can be done over a communication network, for example over the Internet (illustrated by "www" in FIG. 1). The manner of communication used between the server and this module can also be of the WiFi, GPRS or GSM type, for example.

This communication module COM is able, on the one hand, to receive a request for justification of association with a place emanating from this remote server SP. After receiving such a request, the processing module PROC can use the positioning data $d_{POS}$ received from the locating device GEO (either following a request from the PROC, or emitted with the stream) in order to generate the digital certificate ATT required by the remote server.

The communication module COM can then transmit, in reply, data relating to the digital certificate ATT to this remote server SP, so that the individual frequenting this place DO, and justifying this frequenting by means of this digital certificate ATT, can obtain a service supplied by the service provider from the remote server SP.

In particular, these data relating to the digital certificate ATT can be the digital certificate itself, or data proving the possession of such a digital certificate, constructed for example from random data received, coming from the remote server SP, by the communication module COM.

Figure 2:
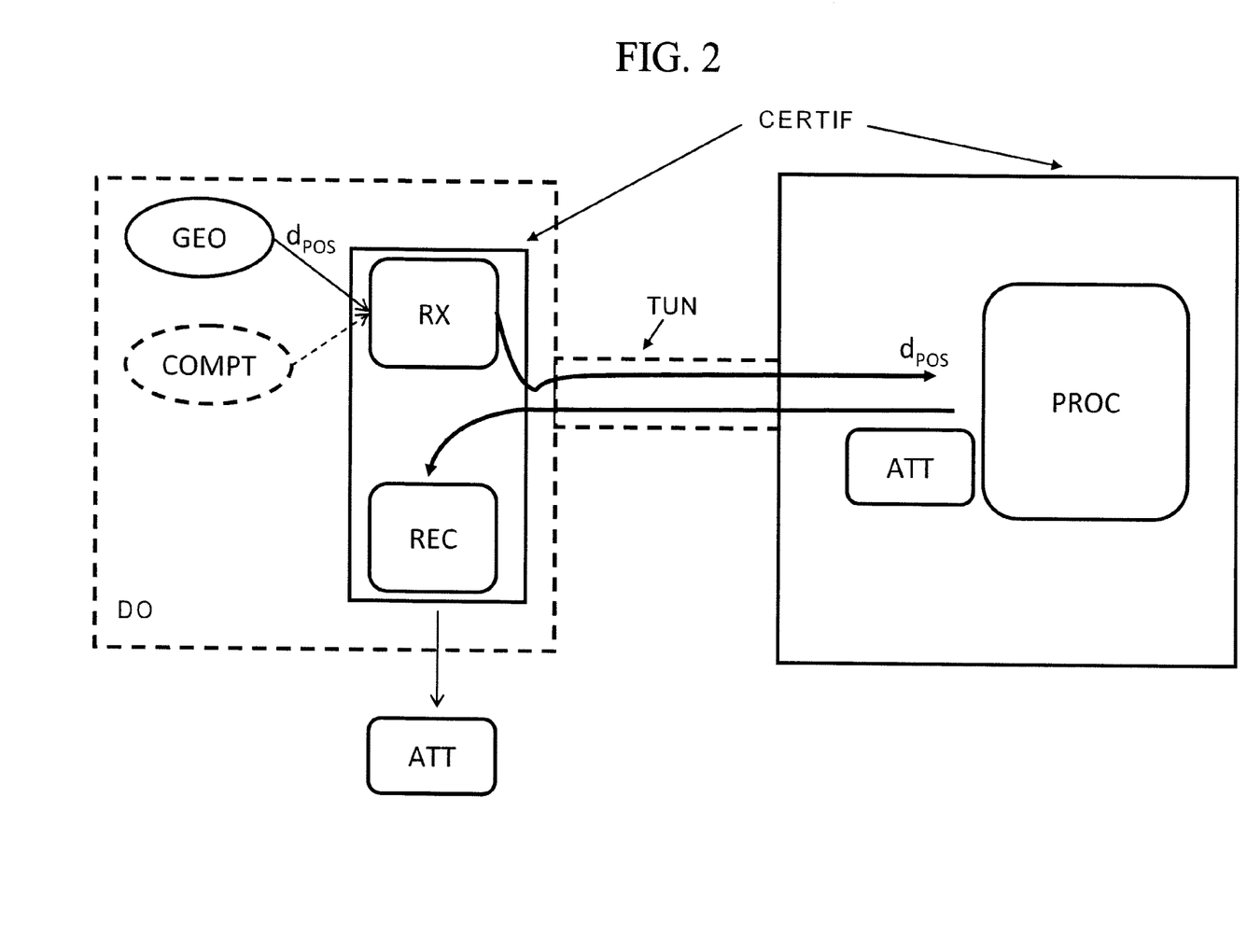
FIG. 2 illustrates an alternative embodiment of a certifying device according to the present invention, in which generation of the certificate is remote.

Reference is now made to FIG. 2, which illustrates an alternative embodiment of the certifying device CERTIF, in which the processing module PROC is remote relative to the receiving module RX.

In this embodiment, the processing module PROC, tasked with generating the digital certificate ATT as a function of the positioning data $d_{POS}$ received by the receiving module RX, is separate from this receiving module RX, itself located in the immediate proximity of the place DO, or even in this place DO.

With such an embodiment, only the receiving module RX, and optionally the recording module REC, remains in the proximity of the place DO, whereas the processing module PROC can be located at a distance from this place DO.

Communications between the receiving module RX and the receiving module PROC can take place advantageously via a secure tunnel TUN. In the same way as in the embodiment in FIG. 1, the processing module PROC uses input parameters (such as the positioning data $d_{POS}$ received from the locating device GEO, or optionally from a flow meter COMPT) for generating the certificate ATT and supplying it in return to the recording module REC.

Figure 3:
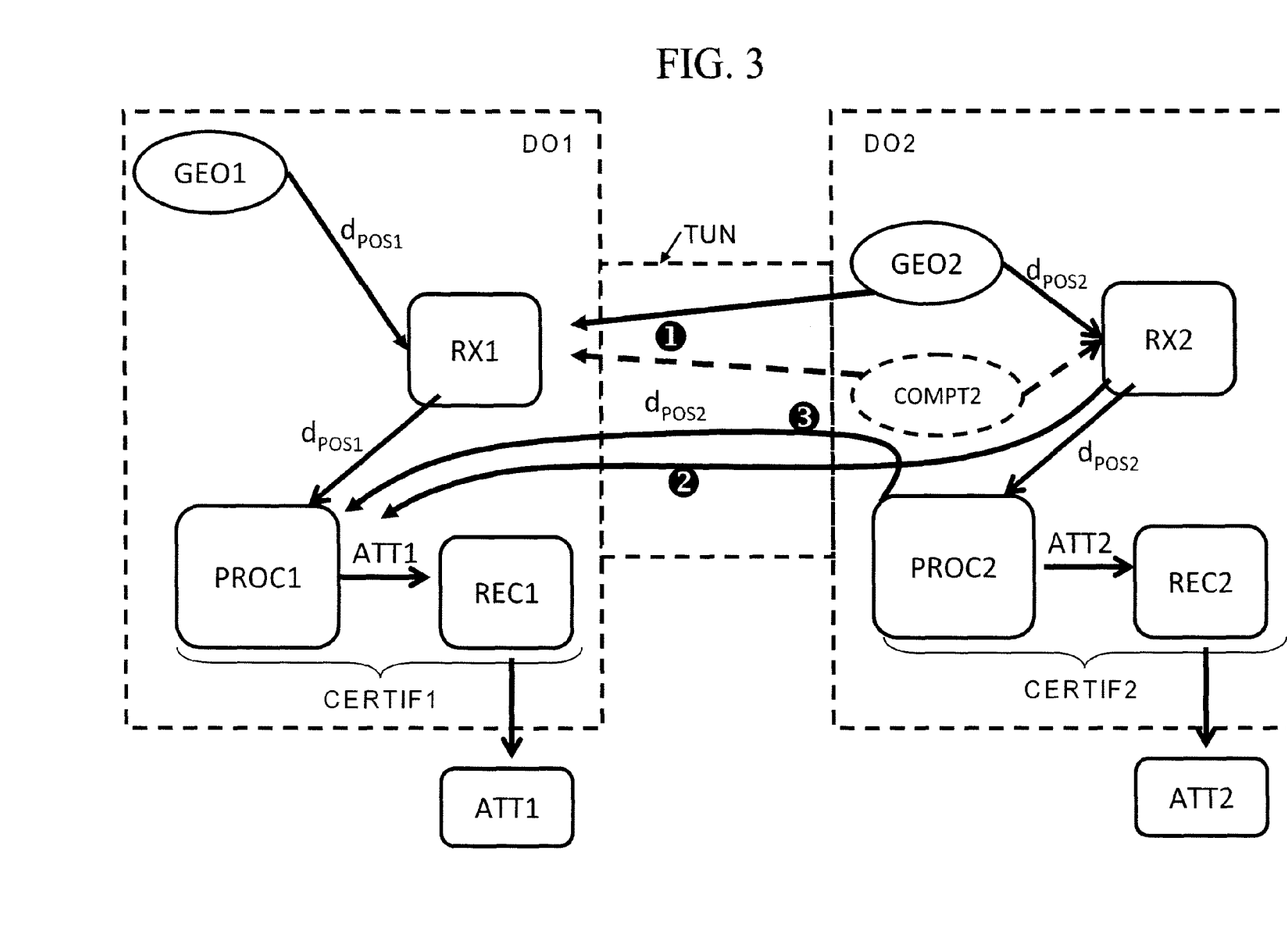
FIG. 3 illustrates a collaborative embodiment in which certifying devices located in nearby places participate in the establishment of certificates.

Reference is now made to FIG. 3, which illustrates another collaborative embodiment in which certifying devices located in nearby places participate in the establishment of certificates.

FIG. 3 shows two separate nearby places DO1 and DO2 in which certifying devices CERTIF1 and CERTIF2 are arranged, comprising a receiving module RX1 (RX2 respectively), a processing module PROC1 (PROC2 respectively) and a recording module REC1 (REC2 respectively) similar to the modules described in relation to FIG. 1. These certifying devices generate the digital certificates ATT1 and ATT2 respectively, certifying an association with the place DO1 and the place DO2.

The receiving module RX1 of certifying device CERTIF1 receives positioning data $d_{POS1}$ coming from a locating device GEO1 located in the first place DO1, whereas the receiving module RX2 of certifying device CERTIF2 receives positioning data $d_{POS2}$ coming from a locating device GEO2 located in the second place DO2, as well as any positioning data relating to the position of a meter COMPT2 also located in this second place DO2.

This embodiment is based on collaborative generation of the first digital certificate ATT1 relating to the first place DO1.

In this instance, besides the positioning data $d_{POS1}$, the certifying device can use input parameters additional to (or replacing) those of the first place DO1, coming from the second place DO2, for generating the digital certificate ATT1.

These parameters, which can come from three types of components located in the second place DO2, can be as follows:

one (or more) additional piece(s) of positioning data $d_{POS2}$ from the locating device GEO2 or optionally from the meter COMPT2 (path denoted by "1" in FIG. 3);

one (or more) additional piece(s) of positioning data $d_{POS2}$ from the receiving module RX2 of the second certifying device CERTIF2 (path denoted by "2" in FIG. 3);

one (or more) additional piece(s) of positioning data $d_{POS2}$, consisting of a data and/or an exchange from the processing module PROC2 and indirectly based on one (or more) additional piece(s) of positioning data as described above and received by the processing module PROC2 of the second certifying device CERTIF2 (path denoted by "3" in FIG. 3); and an additional positioning data $d_{POS2}$ from a digital certificate ATT2, received coming from the second certifying device CERTIF2 and analysed by the processing module PROC1.

The certificate thus formed collaboratively makes it possible to reinforce its confidence index. It will therefore be understood that this collaboration can consist of:

on the one hand, recovery of the nearby positioning data and their associated reliability indicators, and on the other hand, analysis of the data of one or more digital certificates generated by nearby devices.

Advantageously, the exchanges between these components can take place via a secure connection, of the secure tunnel type for example, and via a confidence relation that exists between the processing modules PROC1 and PROC2.

Figure 4:
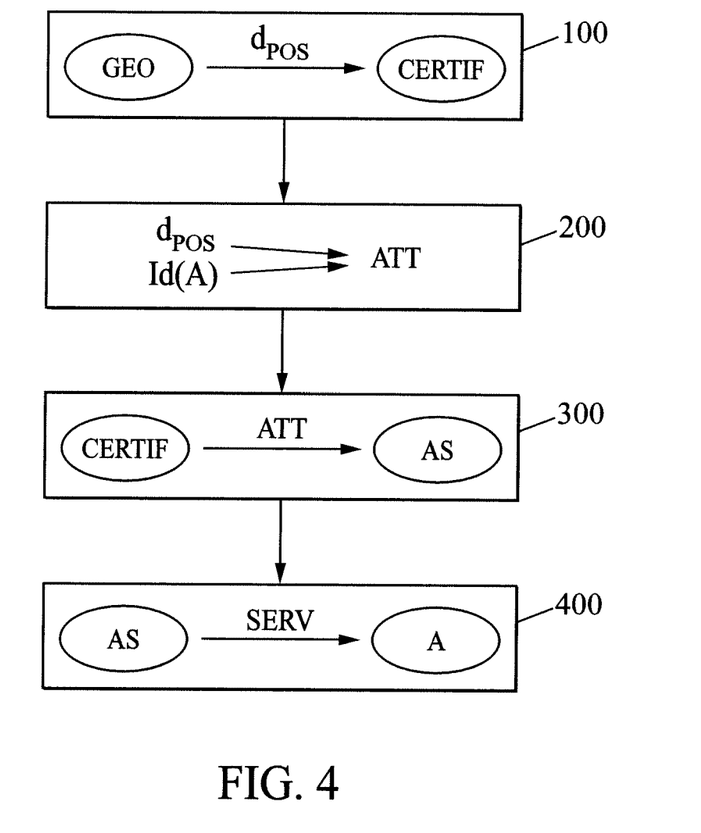
FIG. 4 illustrates the steps of a method of delivering a digital certificate according to the present invention.

Reference will now be made to FIG. 4, which illustrates the steps of a method of delivering a digital certificate ATT of the association between an entity A and a place DO according to the present invention.

Firstly, one (or more) piece(s) of positioning data $d_{POS}$, coming from at least one locating device GEO located in a geographic area located in the proximity of the place DO, is received by a certifying device CERTIF (step 100). The certifying device CERTIF can be located within the place DO, but can also be moved partially outside of this same place DO, as illustrated in FIG. 2.

Generation of the digital certificate ATT is dependent on a condition that is explicitly linked to the positioning data $d_{POS}$. Depending on the value of this positioning data $d_{POS}$, this condition for generation therefore allows the mechanism for generating the digital certificate ATT to be locked or unlocked. Beyond its intrinsic value, the condition can also take into account the reliability indicator, qualifying this data $d_{POS}$.

When the condition for generation is satisfied, the certifying device CERTIF generates a digital certificate ATT associating the entity A with the place DO (step 200).

For said generation, the algorithm used is based on input parameters. Among these potential parameters, but not limited to them, may be considered: the positioning data $d_{POS}$, elements for identification or authentication Id(A) of the entity A in question (which is an individual or an object), a criterion of regularity of frequenting of the place DO by this entity, other parameters coming from confidence equipment (cf. the collaborative case illustrated in FIG. 3) or any other parameter that is relevant in the case of the target service.

Each of these input parameters is advantageously associated with a reliability indicator, making it possible to qualify it. The certifying device CERTIF can then aggregate all of these reliability indices within one and the same confidence index, directly associated with the digital certificate ATT thus generated.

This digital certificate ATT is in the form of a digital data, in particular consisting of attributes and advantageously protected by one or more cryptographic mechanisms. Among others, the conceivable mechanisms for guaranteeing the authenticity of this digital certificate ATT are as follows: digital signature mechanism comprising an asymmetric encryption mechanism and associated with a hashing or condensate mechanism, symmetric cryptography mechanism, mechanism for authentication and protection of the device containing the digital certificate ATT.

Independently of the criterion of visibility that is associated with them, the attributes constituting this digital certificate ATT can optionally explicitly mention some or all of the input parameters of the algorithm for generating this certificate ATT, either in a crude or an enriched manner. This eventuality depends on the target service, and it is conceivable to have a certificate ATT that does not offer this type of mention.

Depending on the requirements, the attributes of one and the same digital certificate ATT can be presented differently depending on the third party making the request.

Identification or authentication can be used as input parameter for generation of a certificate ATT, but without this certificate allowing tracing of this identity. The certificate can therefore ensure anonymous character of the entities behind their creation and thus protect the private life of the cases of usage.

Such a digital certificate can have a limited life (for example one or two weeks), which is in particular advantageous when the certificate ATT is intended to be stored on a mobile physical medium CMS that might be lost by its user.

Once this digital certificate ATT has been generated, it can be used for verifying (step 300) the association between the entity A and the place DO, in order to obtain a service SERV, depending on the association of the entity A with this place DO and offered by a service provider AS. This verification is typically carried out by a service provider AS in order to determine the supply, or non-supply, of the service SERV.

This verification can be carried out by means of physical transport of the digital certificate or by exchange with a remote server over a communication network.

Thus, the digital certificate can advantageously be recorded on a mobile recording medium CMS, which can be presented to the service provider in order for the service provider AS to accept the digital certificate ATT.

In another embodiment, exchange of data relating to the digital certificate ATT can be carried out with a remote server SP belonging to the service provider AS, following receipt of a request for justification of place emanating from this service provider, in order to permit this verification.

In a first example of this embodiment, this exchange of data comprises sending the digital certificate ATT itself to the remote server SP, in order to be used by this remote server SP for verifying the association of the entity A with the place DO. The confidence index of the digital certificate ATT allows the server SP, moreover, to check the level of reliability of the certificate sent.

In another example of this embodiment, this exchange of data comprises sending digital data proving possession of such a digital certificate ATT, for example cryptographic proof of knowledge of this certificate constructed from random data transmitted by the remote server SP, and not from the digital certificate ATT itself, for reasons of confidentiality. Verification of the association of the entity A with the place DO is then carried out, by the remote server SP, by means of digital data of this kind, for example by verifying proof of knowledge.

Finally, after verification by the service provider AS of the association of the entity A requesting this service with the place DO, by means of the digital certificate ATT delivered, the service SERV is supplied to this entity A (step 400). Such a service SERV can in particular be supplied as a function of the confidence index of the digital certificate ATT delivered.

The present invention further relates to a computer program comprising code instructions for carrying out step 200 of generation of the digital certificate as described above, when these code instructions are executed by the processing module PROC of a certifying device CERTIF as described above.

Such a computer program can use any programming language, and can be in the form of a source code, object code, or intermediate code between source code and object code, such as in a partially compiled form, or in any other desirable form.

The present invention also relates to a data medium readable by a computer or a data processor, and comprising code instructions of one of the programs mentioned above.

This data medium can be any entity or device capable of storing the program. For example, the medium can comprise a storage means, such as a ROM, for example a CD-ROM or a microcircuit ROM, or a magnetic recording means, for example a floppy disk or a hard disk. This data medium can also comprise memory of the FLASH type, for storing the program and recording the data received by a client module, and memory of the RAM type for saving temporary data such as the server lists and associated themes.

Moreover, this data medium can be a transmissible medium such as an electrical or optical signal, which can be conveyed via an electrical or optical cable, by radio or by other means. The programs according to the invention can in particular be uploaded to a network of the Internet type.

The present invention finds advantageous applications in many diverse and varied areas.

Thus, the invention finds an advantageous application in the area of the authentication of individuals by administrative services, or in a commercial context for accessing services of a certain type, by means of mobile physical media.

As an example, the mobile physical medium can be used for managing energy certificates that can serve for counting electricity credits. Thus, controlled electricity consumption during the peak hours could allow credits to be obtained, assigned to the mobile physical medium bearing the digital residence certificate, and these credits can be spent to pay for fuel at a petrol pump by means of this mobile physical medium.

The present invention also finds an advantageous application in the area of home automation, for remote management of equipment by a service provider, in order to create a trusted ecosystem geolocated within a given place.

In particular, with the system of the present invention, it is possible to connect a domestic equipment to a remote manager, and thus simplify management of the right of access, beyond the private network of the residence, as well as access to resources outside of the residence, owing to digital certificates as described above.

Another example of application consists, in a cultural or leisure context, of evaluating a relation with the place, which can be short, for example passing in front of a work of art: the user's smartphone recovers, during said passage, a certificate giving the right to offers or reductions.

Another example of application consists, in the context of Internet purchases or of banking operations, of not being able to perform certain sensitive operations except from a place previously recognized by the third party. For example, purchases totaling more than a defined sum can only be made from the user's residence.

As the invention can serve to prove that one (or more) person(s) is (are) in a given place at a given point of time, it can be used in a business context (security patrol), leisure context (treasure hunt, orienteering) or sport (marathon).

The use of a certifying device as described above can make it possible, in general, to obtain access to multiple services, located in the reference place or beyond, while ensuring demarcation between these services via separate profiles.

Moreover, it allows better control of access and data relating to private life, as well as traceability of the use of such elements of proof.

Moreover, there are certain situations where persons, or objects, need an association with a place, without necessarily belonging there. For example, during loan of equipment or movement of equipment in a rented residence, the object must be able to have a residence certificate even though it is only present temporarily in this place.

Regarding the mobile container used for storing the digital certificate of association can serve for multiple applications such as home automation, with government departments or merchants, etc.

Thus, the containers are independent and certain readers can only read certain containers. The information contained in the container can be deliberately limited, for example in order to anonymize the data and thus protect the private life of the person using it: a merchant will know that this person lives in the district, but will not find out his name or his address.

For objects, this container can be used on the one hand for configuring the object in question (recovery of data relating to the place, for example a configuration for Internet connectivity, an address, for obtaining an identity relating to the place, etc.) and relate it to its manufacturer (automatically informing the manufacturer of the date of putting into service, the address, the model and the serial number of the object). On the other hand, this container will receive information (model, serial number, etc.) from the object, and said data can be used in return in order to include the object in the trusted ecosystem of the objects relating to this place.

In addition to its certifying role, the overall device therefore also makes it possible to aggregate, reference and manage the objects relating to the place in question. This device therefore makes it possible to organize the trusted ecosystem of objects relating to the place in question.

The case of a digital certificate ATT assigned to an object A can be illustrated by a residence DO comprising a certain number of equipment, for example household electrical goods (for example a refrigerator, a microwave oven, a washing machine, etc.) or "brown" equipment (TV, hi-fi system, etc.) managed remotely by a service provider.

By assigning a digital certificate ATT to this equipment, it is possible to constitute a trusted ecosystem located within the residence DO. This digital certificate ATT can then be supplied to the service provider in order to obtain maintenance services from the latter. By supplying proofs of relation to a place, this allows interactions with external services. Moreover, the confidence index of the digital certificate ATT allows the provider to check the level of reliability of the certificate. The various cryptographic properties associated with the certificate can also reinforce the service and can permit, following automatic messaging, despatch of a technician after a fault is self-diagnosed by the equipment.

Of course, the invention is not limited to the embodiment examples described and illustrated above, on the basis of which it will be possible to envisage other embodiments, while remaining within the scope of the invention.

The invention claimed is:

1. A method of data processing for digitally certifying the association of at least one entity with a place, wherein the entity is at least one individual or at least one object and the place is a residence or office or business premises, said method comprising the following steps:
   receiving at least one positioning data coming from at least one locating device located in the proximity of said place, the positioning data received being associated with a reliability indicator;
   generating a digital certificate associating the entity with said place as a function of the positioning data received,
   further generating a confidence index for said digital certificate, said confidence index having a value among a plurality of values, said value being a function of an aggregation of reliability indicators of the positioning data used to generate the digital certificate; and
   verifying, by means of said digital certificate, the association of the entity with said place in order to obtain, as a function of the confidence index of the digital certificate, a service that is dependent on the association of the entity with said place,
   wherein said service has a plurality of degrees respectively corresponding to different levels of access restriction to usage options of the service, and
   wherein verifying the association of the entity with said place comprises determining a degree of the service that the digital certificate grants access to based on the value of the confidence index, and granting access to said degree to said entity.

2. The method according to claim 1, wherein the entity is an individual frequenting at least temporarily said place, said digital certificate being generated moreover as a function of at least one identifying and/or authenticating data of the individual.

3. The method according to claim 1, wherein the entity is an object located in said place, said digital certificate being generated moreover as a function of at least one identifying and/or authenticating data of the object.

4. The method according to claim 1, comprising recording of the digital certificate and of the confidence index on a mobile recording medium, which can be presented to a service provider in order to permit verification of the association of the entity with said place by the service provider.

5. The method according to claim 1, comprising an exchange of data relating to the digital certificate and the confidence index with a remote server belonging to a service provider, following receipt of a request for justification of place emanating from this service provider, in order to permit verification of the association of the entity with said place by the service provider.

6. The method according to claim 1, wherein a plurality of positioning data is received coming respectively from a plurality of locating devices located in the proximity of said place.

7. The method according to claim 1, wherein at least one additional positioning data is received from a nearby place separate from said place, generation of the digital certificate being carried out moreover as a function of said additional positioning data.

8. The method according to claim 7, wherein the additional positioning data is received coming from a locating device located in the proximity of said nearby place or from a certifying device located in said nearby place.

9. A certifying device, capable of digitally certifying the association of at least one entity with a place, wherein the entity is at least one individual or at least one object and the place is a residence or office or business premises, the device comprising a receiving module and a processing module, wherein:
the receiving module is able to receive at least one positioning data emitted by a locating device located in the proximity of said place, the positioning data received being associated with a reliability indicator; and
the processing module comprises a central processing unit and is configured:
to generate a digital certificate depending on a positioning data received by the receiving module, and
to further generate a confidence index for said digital certificate, said confidence index being having a value among a plurality of values, said value being a function of an aggregation of reliability indicators of the positioning data used to generate the digital certificate;
said digital certificate being verifiable, by a service provider, in order to obtain, as a function of the confidence index of the digital certificate, a service that is dependent on the association of the entity with said place, said service having a plurality of degrees respectively corresponding to different levels of access restriction to usage options of the service, whereby the service provider determines a degree of the service that the digital certificate grants access to based on the value of the confidence index, and grants access to said degree to said entity.

10. The certifying device according to claim 9, wherein the processing module further comprises a recording module configured for recording the digital certificate and the confidence index on a mobile recording medium that can be presented to the service provider in order to obtain the service.

11. The certifying device according to claim 9, wherein the processing module further comprises a communication module able to receive a request for justification of place emanating from a remote server belonging to the service provider and to transmit in reply, to said remote server, data relating to the digital certificate.

12. A data processing system, for digitally certifying the association of at least one entity with a place, comprising at least one certifying device according to claim 9, and at least one locating device configured for transmitting at least one positioning data to the certifying device.

13. The data processing system according to claim 12, comprising a plurality of separate locating devices, each of said locating devices being configured for transmitting a positioning data to the certifying device.

14. The data processing system according to claim 12, comprising at least one first certifying device and a second certifying device located respectively in said place and in a nearby place separate from said place.

15. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

* * * * *